(12) United States Patent
Snedeker et al.

(10) Patent No.: US 10,897,384 B2
(45) Date of Patent: Jan. 19, 2021

(54) HART FSK DIGITAL DEMODULATOR

(71) Applicant: Texas Instruments Incorporated, Dallas, TX (US)

(72) Inventors: Michael Douglas Snedeker, Tucson, AZ (US); Hugo Cheung, Tucson, AZ (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 136 days.

(21) Appl. No.: 15/726,269

(22) Filed: Oct. 5, 2017

(65) Prior Publication Data

US 2019/0109740 A1 Apr. 11, 2019

(51) Int. Cl.
*H03D 3/00* (2006.01)
*H04L 27/14* (2006.01)
*H04L 27/227* (2006.01)
*H04L 27/12* (2006.01)
*H04B 3/04* (2006.01)
*H04L 7/00* (2006.01)
*H04L 25/40* (2006.01)

(52) U.S. Cl.
CPC ............. *H04L 27/227* (2013.01); *H04B 3/04* (2013.01); *H04L 7/0087* (2013.01); *H04L 25/40* (2013.01); *H04L 27/12* (2013.01); *H04L 27/14* (2013.01)

(58) Field of Classification Search
CPC ..... H04L 27/227; H04L 27/14; H04L 7/0087; H04L 27/12; H04L 25/40; H04B 3/04
USPC ........................................................ 329/300
See application file for complete search history.

(56) References Cited

U.S. PATENT DOCUMENTS 5,376,894 A * 12/1994 Petranovich .......... H04L 7/0331
329/306
2015/0103957 A1 * 4/2015 Agar .................... H04L 27/1563
375/334

* cited by examiner

*Primary Examiner* — Richard Tan
(74) *Attorney, Agent, or Firm* — Ray A. King; Charles A. Brill; Frank D. Cimino

(57) ABSTRACT

A digital demodulator for use with a Highway Addressable Remote Transducer (HART) modem is provided. Analog input signals are digitized according to a sampling clock rate to produce a discrete time signal. Filtering and edge detection allow determinations of "mark" or "space" data in a demodulated signal in conjunction with analyzing a detected signal period, a cycle period, count histories and/or an on/off signal period.

20 Claims, 3 Drawing Sheets

HART FSK DIGITAL DEMODULATOR

BACKGROUND

Description of Related Art

The Highway Addressable Remote Transducer (HART) protocol takes direct current (dc) signals and modulates them according to frequency shift keying (FSK) methodologies to permit communication on a dc line. The HART Communication Protocol is a hybrid analog/digital industrial automation protocol that is useful in overlaying intelligence on otherwise dumb devices. An advantage of the HART protocol lies in permitting communication over legacy 4-20 mA analog instrumentation current loops and sharing pairs of wires used by analog-only host systems.

HART uses a frequency-shift keying (FSK) principle, in which digital information is transmitted through discrete frequency changes of a carrier signal. A digital signal may be made up of two frequencies, for example, 1200 Hz and 2200 Hz representing bits 1 and 0, respectively.

Digital words can be transmitted by modulating, for instance, digital ones according to a sinusoid at a first frequency, 1200 Hz ("Mark") and digital zeros according to a sinusoid at a second frequency, 2200 Hz ("Space"). Likewise, those modulated sinusoids can be demodulated to recover digital words.

Sine waves of these two frequencies (1200 Hz and 2200 Hz) are superimposed on a DC analog signal cables to provide simultaneous analog and digital communications. Because the average value of the FSK signal is always zero, the 4-20 mA analog signal is not affected.

FIG. 1A illustrates a block diagram of a HART universal asynchronous receiver/transmitter (UART) device which may use the HART communication protocol to transmit and receive signals . . . . Digital words enter the UART at the TX input where frequency shift keying (FSK) takes place at block FSK and the result undergoes digital to analog conversion to produce modulated analog sinusoids.

FIG. 1B illustrates waveforms produced according to the above-described circuit of FIG. 1A, showing example waveform streams. The HART protocol calls for a start bit, 8 digital data bits, a parity bit (for error checking according to odd parity) and a stop bit. Digital words entering at TX are processed to produce the HART-OUT waveform as shown with digital 1s ("Mark") modulated at 1.2 kHz and digital 0s ("Space") modulated at 2.2 k Hz. With reference both to FIG. 1B and FIG. 1A, the HART-Out signal shown can be fed back to the RXA signal entering the modem at input RXA, and ideally, an RXD signal should result representative of the original input at TX. The RXA signal is processed through an analog to digital converter (ADC) and further processed through a digital signal processor (DSP).

HART certification sets a baseline for HART compliance testing. A need exists to provide better HART demodulator equipment that provides an improvement in the accuracy rate that would make the protocol more efficient by reducing the need to discard data packets.

To operate the demodulator over the 4 to 20 mA current loop, products in the market must be able to operate with a limited power consumption budget. A zero crossing detector, such as a voltage comparator, may be used to detect a sine waveform transition from positive and negative, along with digital filters in order to meet power and silicon area design constraints. Modems operating according to the HART protocol should both pass approval tests and also achieve marginal noise immunity in real world industrial applications. Other, more sophisticated demodulation schemes are possible, but the power consumption constraint cannot be met.

Based on the foregoing, there is a need in the art for a HART demodulator that is relatively glitch and jitter free, that can tolerate a high error rate, in spite of noise, providing a potential for out of band accuracy, and provide a low power consumption with a small digital area.

SUMMARY

Digital demodulation is provided by detecting a signal transition;
sampling a detected analog signal at a clock rate to produce a discrete time signal;
filtering the discrete time signal; detecting a transitioning edge of the discrete time signal;
counting time between edge transitions of the discrete time signal; storing edge transition time count data and associated signal information; and determining digital bit data in connection with stored edge transition time count information.

Features and technical advantages of aspects described herein, will be apparent from the following, including the accompanying drawings and claims.

BRIEF DESCRIPTION OF THE DRAWINGS

Reference is now made to the ensuing descriptions taken in connection with the accompanying drawings briefly described as follows.

DETAILED DESCRIPTION

A HART FSK digital demodulator is provided, allowing for implementation as a system, method and apparatus. In the following description, for purposes of explanation, numerous specific details are set forth in order to provide a thorough understanding of the foregoing. It will be apparent, however, to one skilled in the art that the foregoing can be practiced without these specific details. In other instances, structures and devices are shown in block diagram form in order to avoid obscuring this disclosure.

In various examples, the HART FSK digital demodulator is provided including a band-pass filter, comparator, digital synchronizer (including a fractional clock divider) [AV see comment to [0026-27]], digital glitch filter, edge detector unit, counter, count storage, and a decision module. The digital demodulator provided may allow for noise resistance, jitter and other error toleration, and relatively low resource consumption for both power and real estate. Thus, one may provide better performance in a UART using the implementations described below relative to prior designs.

Figure 1A:
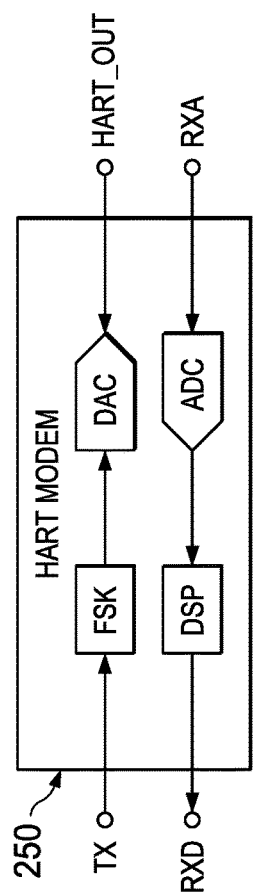
FIG. 1A illustrates a block diagram of a HART UART
Figure 1B:
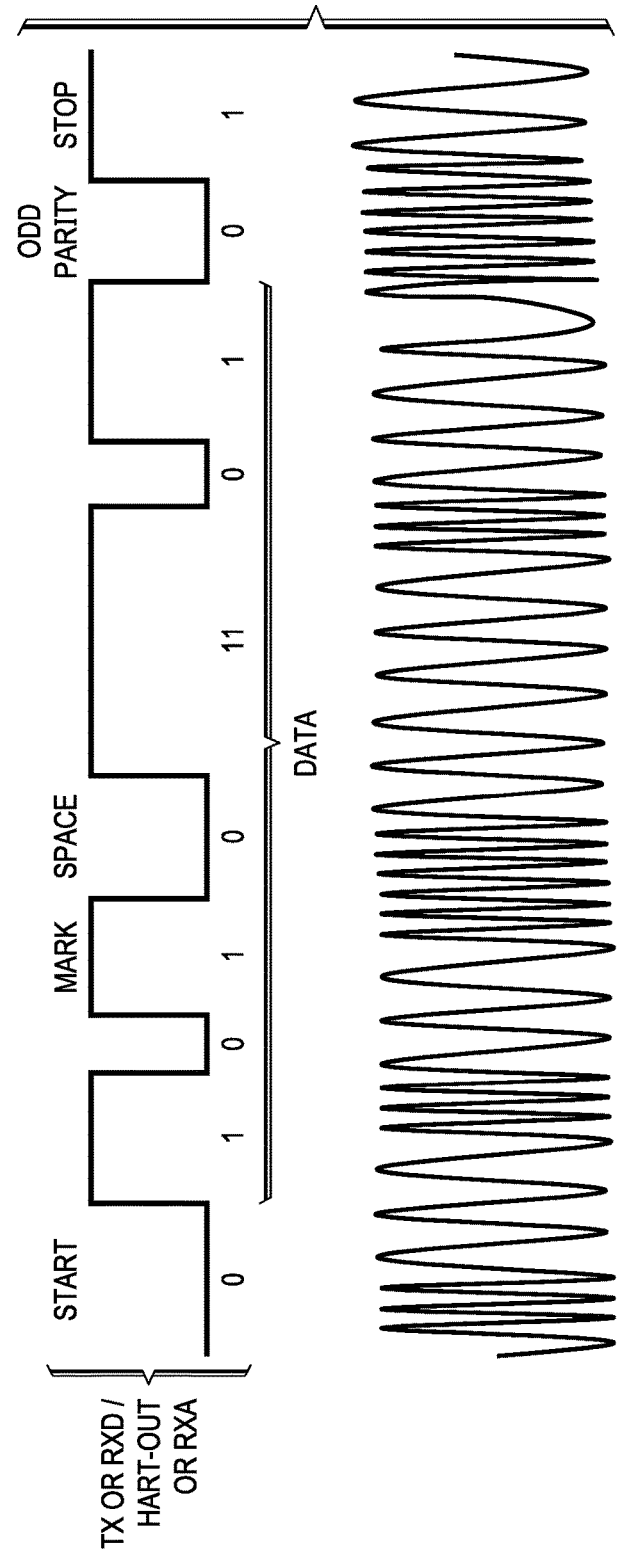
FIG. 1B illustrates waveforms produced according to the above showing an exemplary waveform streams.
Figure 2:
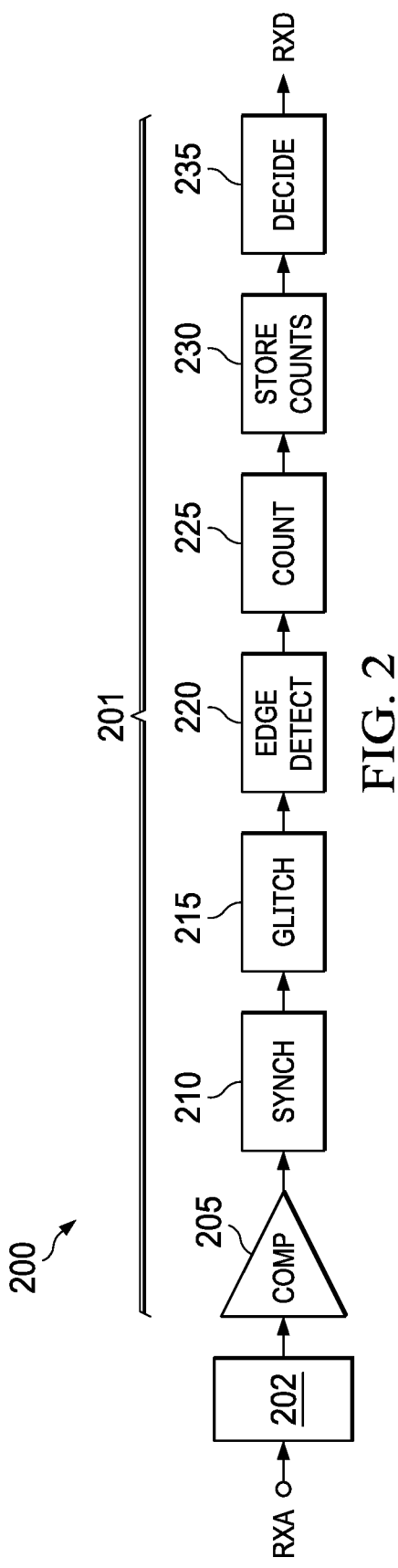
FIG. 2, illustrates a block diagram of a demodulator showing a functional diagram provided by the demodulator components.

As an example implementation, FIG. 2, illustrates demodulator 201 which may be part of UART (or modem) 200. Demodulator 201 is shown as demodulator stages according to a functional diagram providing the demodulator components. Input RXA is the analog sinusoidal input to the demodulator and output RXD is the final digital output. An analog band-pass filter 202 may block out all but a range of frequencies, in a signal from input RXA, within the operational range of the HART protocol, the operational frequency of the HART protocol being within 1200 Hz-2200 Hz. Band pass filter 202 may filter, for instance, a band of frequencies between approximately 500 Hz-10 kHz. Comparator 205 implements a level detector with hysteresis to detect the presence of the signal at the input of comparator 205 and to start the demodulation process. In connection with a detected continuous time analog signal at the input of comparator 205, this signal is passed to digital synchronizer unit 210 which samples the analog signal to produce a discrete-time signal at the output of digital synchronizer unit 210. Digital synchronizer unit 210 provides an interface between a synchronous system clock and asynchronous inputs, so as to bring asynchronous inputs into the clocked system. One way of implementing a digital synchronizer is with a clocked flip-flop, which provides a high or low signal, depending on the high or low status of the asynchronous input at the clock signal strike. Synchronizers known in the art may comprise flip-flops or asynchronous state machines (ASM), among other means of synchronizing a signal with the clock.

A fractional clock divider divides the source clock by a factor, providing an accurate sampling frequency of many times the frequency of the signal to be sampled by digital synchronizer unit 210, with an example accuracy of plus or minus 1%. The sampling rate may also be many times a UART baud rate, so as to provide meaningful sampling of the UART signal. This sampling rate is chosen to be high enough and accurate enough to reduce unwanted sampling noise, and it may be low enough to reduce total power consumption. The range depends on the power budget available, wherein a higher power may provide a greater rate and may be able to withstand noisier environments.

In one example, the fractional clock divider divides by 21.33 to give an sampling frequency of 57.6 kHz from a 1.2288 MHz source clock with plus or minus 1% accuracy. For this example, the 57.6 kHz sampling rate is 48 times the UART baud rate, thus providing a relatively high resolution sampling of the signal while balancing the amount of power required for sampling. In another example, the sampling rate is chosen from a range of frequencies between 9600 Hz and 230.4 kHz, inclusive, providing a good range of accuracy in keeping with reasonable power requirements.

Digital glitch filter 215 provides a circuit that removes unwanted "glitch" pulses, or signal transitions without functionality, on the digital input lines stemming from input at RXA. Glitches may occur on lines and may stem from various sources of noise. Glitch power comes under dynamic dissipation and is often proportional to switching activity. High frequency noise that passes through the comparator is removed by the glitch filter. The glitch may be represented by a short frequency variation which is neither close to 1200 Hz nor 2200 Hz, for example. Digital glitch filter 215 feeds the discrete time signal from digital synchronizer unit 210 through digital glitch filter 215 to edge detector unit 220.

Figure 3:
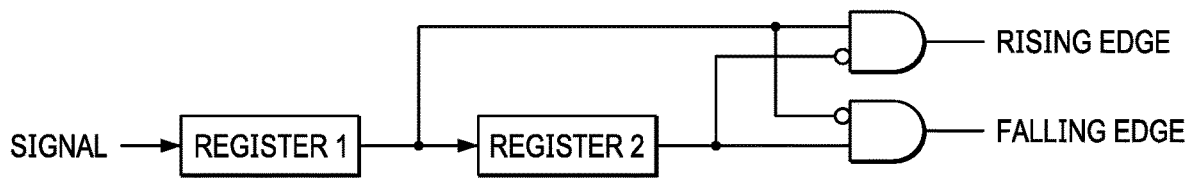
FIG. 3 illustrates a logic diagram of an edge detector for implementation of the HART digital demodulator as provided herein.

Edge detector 220 determines a rising or falling edge of the discrete time signal and counter unit 225 counts the time between similar edges, rise-to-rise or fall-to-fall corresponding to a known or determined period of time for a data bit transmission. Thusly, data inputs have effect on an edge transition time count only in connection with a designated type of transition (rising edge-to rising edge or falling edge-to falling edge) detected by edge detector 220. The edge detection count is determinative of whether a Mark (digital 1) or space (digital 0) is being transmitted according to the HART protocol (a start bit, 8 digital data bits, and an odd parity bit and a stop bit). FIG. 3 is a logic diagram representation of edge detector 220 using standard logic symbols. Edge detector 220 may be configured to detect a rising or a falling edge from inputs from Register 1 and Register 2.

Counter unit 225 counts the time between similar edges transitions, e.g., the time between rising to rising edge transitions or falling-to-falling edge transitions, respectively, of a signal. In an example, counter 225 includes two internal counters to provide capability for counting time in connection with, for example, four edges—two rising edges and two falling edges. Alternatively, one may understand this as counting two types of periods—a rising-to-rising edge period and a falling-to-falling edge period. By disregarding certain count values a band-pass or notch filter is implemented herein. A transition count history is determined by sampling transitions with a 57.6 kHz sampling frequency. The result is stored in Count Storage Unit 230.

Ideally, given the known frequencies of the mark and space frequency, a 1200 Hz "Mark" frequency has an approximately 833 µs period (r) while the 2200 Hz "Space" frequency has an approximately 454 µs period (r). Detection of frequencies or periods outside of these values require a determination as to whether they are indicative of the transmission of a digital one ("mark"), digital zero ("space") or an error (noise, etc.). Additionally the 1700 Hz frequency represents the threshold frequency separating the carrier frequency values between digital one (1200 Hz) and digital zero (2200 Hz). Consequently, detection of threshold frequencies which are determined to be 1700+/−100 Hz (giving a range between approximately 1600 to 1800 Hz) are rejected as in-band noise.

In determining "Mark" and "Space" frequencies, at least a couple of methods may be used. With a known clock frequency, the number of clock periods can be counted from the reference clock in between known events such as zero crossings. Alternatively, events, such as zero crossings, in between clock periods may be counted. The latter method is inherently less accurate as it provides more quantization errors, especially as clock frequency increases.

Count Storage Unit 230, which may be implemented in a memory or register, for example, compares the threshold values defining the passband of the "mark" and "space" frequencies. Threshold values may be used advantageously in determining the transmitted information in a signal and to disregard noise, glitches, etc. For instance, detection of a frequency component during a period of time substantially outside of a window of time corresponding to the bit rate of the data can likely be discarded as noise or a glitch. Consequently, a detected frequency of, for instance, 1400 Hz may be regarded as a "Mark" frequency and therefore a digital "1" transmission. Additionally, a detected frequency of, for instance, 2300 Hz might be regarded as a "Space" frequency and therefore a digital "0" transmission. Frequencies indicative of indeterminate transmissions such as those between 1600 Hz and 1800 Hz may be regarded as noise and discarded. In one example, this function is performed by a notch filter which also may aid in achieving a desired power budget. Increased sampling results in greater power usage but higher accuracy in determining the frequency of the signal for which a mark or space is to be determined. Further, changing frequency threshold may be used to further reject in-band noise and allows a Finite State Machine (not specifically shown) to search precisely for a Mark-Space transition.

Count Storage Unit 230 may store the count time in a ripple counter or other component known in the art for storing counts on a chip. Decision module 235, makes a decision on a digital value RXD representing the analog input RXA. Decision module 235 may be implemented with a processor such as a microprocessor. Such a processor is contemplated as being located locally with demodulator 210, for example as a processor cored implemented on the same substrate. Alternatively, decision module 235 may be implemented with a processor, such as a microprocessor, that is remotely located from demodulator 210 and or UART 200. In addition to storing count time, Count Storage Unit 230 may also store a count time history of edge transitions leading up to the one under consideration/processing. The count time history is used to calculate the rate of change of the RXA frequency. The more prior histories used to make the intermediate count transition time determinations, the more likely an accurate decision will be made. This comes at a cost of lag, or delay in decision making, but the benefit can outweigh the extra time.

In addition to a count history, Count Storage Unit 230 may store a detected signal period, cycle period, or on/off signal period. These parameters may also be used to make data determination decisions.

Figure 4:
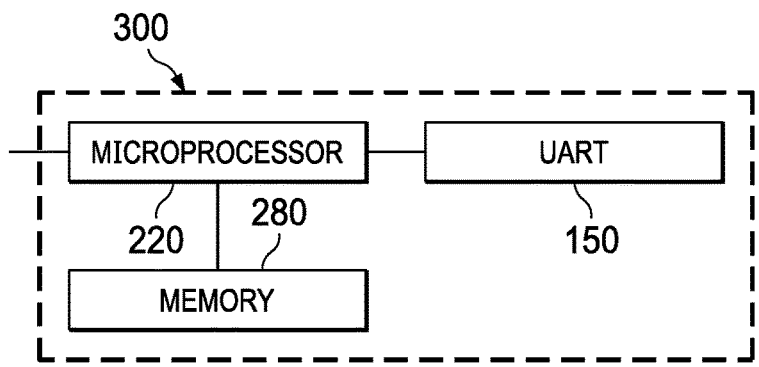
FIG. 4 illustrates a block diagram showing a processor connected to a UART for implementing control of a HART FSK digital demodulator.

The examples described herein may be implemented in conjunction with a memory and a processor programmed with instructions to enable the processor to control the functionality of the demodulator descried herein. FIG. 4 illustrates a block diagram showing processor 220 connected to UART 150, containing the FSK digital demodulator as described herein, and memory 280. Processor 220 may be separated from UART 150 or it may be optionally integrated with UART 150 as microprocessor controlled unit 300.

Figure 5:
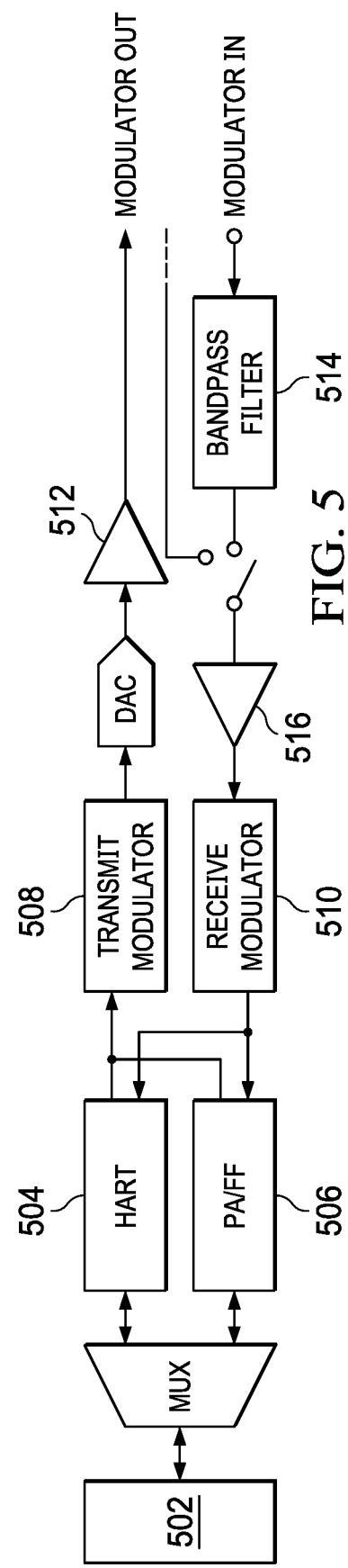
FIG. 5 illustrates a modem architecture including the HART digital demodulator as provided herein.

FIG. 5 illustrates a modem architecture including the HART digital demodulator as provided herein. Digital interface 502 may be configured for use with a UART or a serial peripheral interface for connecting multiplexer MUX which is operable to selectively connect to HART module 504 or PA/FF 506. PA/FF refers to modem selection compatibility for Profibus PA process automation standard. Modulators for transmission, Transmit Modulator 508, and reception, Receive Modulator 510 selectively connect to the HART or Profibus PA system. Digital-to-Analog Converter DAC outputs transmissions of data through a Buffer 512. Received data passes through a bandpass filter 514 and through carrier detector 516 and on to received modulator 510 for reception of data. The foregoing described FSK? HART digital demodulator may be contained with HART module 504 for modulation and demodulation signals according to the HART protocol.

Figure 6:
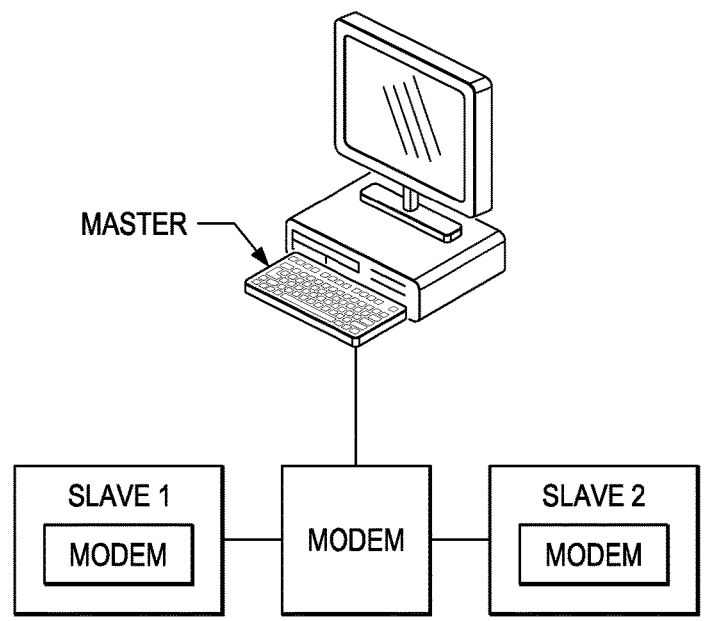
FIG. 6 illustrates a diagram of an application using the FSK digital demodulator as described herein.
Applicable reference numbers have been carried forward.

FIG. 6 illustrates a diagram of an application using the FSK digital demodulator according to the foregoing. Master 600, which may be, for instance, a personal computer (PC) is connected to a modem 602 for communicating to slave devices 604 and 606 which may control, for instance, one or more tightly-controlled factory processes on a factory floor. Slave device 604 may control, for instance, process gas regulation and distribution systems while slave device 606 may control, for instance, process heating and temperature systems. Each slave device 604 and 606 includes or is connected to a modem. Modem 608 is connected to slave device 604 while modem 610 is connected to modem 606. In connection with carrying out a temperature critical within an environment requiring precise regulation of gas introduced within a system chamber, data may be exchanged among the various modes 602, 608 and 610 to carry out monitoring and control in connection with data generated using the FSK digital demodulator of the foregoing.

The system of the examples presented or portions of the system thereof may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement some examples may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device ("PLD") such as a Field-Programmable Gate Array ("FPGA"), Programmable Logic Array ("PLA"), or Programmable Array Logic ("PAL"), or any other device or arrangement of devices that is capable of implementing the steps of the processes described The processing machine used to implement the foregoing may utilize a suitable operating system. Thus, examples herein may include a processing machine running the iOS operating system, the OS X operating system, the Android operating system, the Microsoft Windows™ 10 operating system, the Microsoft Windows™ 8 operating system, Microsoft Windows' 7 operating system, the Microsoft Windows' Vista™ operating system, the Microsoft Windows' XP™ operating system, the Microsoft Windows' NT™ operating system, the Windows™ 2000 operating system, the Unix operating system, the Linux operating system, the Xenix operating system, the IBM AIX™ operating system, the Hewlett-Packard UX operating system, the Novell Netware operating system, the Sun Microsystems Solaris operating system, the OS/2 operating system, the BeOS operating system, the various Apple iphone and MacOS operating systems, the Apache operating system, an OpenStep™ operating system or another operating system or platform.

Further, various technologies may be used to provide communication between the various processors and/or memories, as well as to allow the processors and/or the memories to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the foregoing. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the foregoing may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various examples of the foregoing. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the foregoing. Rather, any number of different programming languages may be utilized as is necessary and/or desirable.

Also, the instructions and/or data used in the practice of the examples may utilize any compression or encryption technique or algorithm, as may be desired. An encryption module might be used to encrypt data. Further, files or other data may be decrypted using a suitable decryption module, for example.

As described above, some examples may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the examples may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by processors.

Further, the memory or memories used in the processing machine that implement the foregoing may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

The foregoing has been described herein using specific examples for the purposes of illustration only. It will be readily apparent to one of ordinary skill in the art, however, that the principles of the described herein may be embodied in other ways. Therefore, the foregoing should not be regarded as being limited in scope to the specific examples disclosed herein, but instead as being fully commensurate in scope with the following claims.

We claim:

1. A digital demodulator comprising:
level crossing detection circuitry having an input and an output;
digital synchronization circuitry having an input coupled to the output of the level crossing detection circuitry and having an output;
a digital glitch filter having an input coupled to the output of the digital synchronization circuitry and having an output;
edge detection circuitry having an input coupled to the output of the digital glitch filter and having an output;
a decision module to determine digital data from demodulated signals, including:
a count circuit to count time between similar edges of a discrete time signal, having an input coupled to the output of the edge detection circuitry and having an output;
a store counts circuit to store count time history information, having an input coupled to the output of the count circuit and having an output; and
a decide circuit to determine the digital data based at least in part on the stored count time history information, having an input coupled to the output of the store counts circuit.

2. The demodulator of claim 1 wherein the level crossing detection circuitry detects a zero level crossing.

3. The demodulator of claim 2 wherein the edge detection circuitry includes two counters configured to extract a rising-to-rising edge and a falling-to-falling edge period, respectively, of the discrete time signal.

4. The demodulator of claim 1 wherein a rising-to-rising edge and falling-to-falling edge period is stored in the decision module.

5. The demodulator of claim 1 wherein the level crossing detection circuitry includes:
a comparator; and
a band-pass filter coupled to an input to the comparator.

6. The demodulator of claim 5 wherein the band-pass filter has a filtering range of approximately 500 Hz 10 kHz.

7. The demodulator of claim 1 wherein the decision module determines the digital data based on the stored count time history information, and associated signal information consisting of information selected from a detected signal period, a cycle period, an on/off signal period, decision histories and a combination thereof.

8. The demodulator of claim 1 wherein the digital demodulator is operable to demodulate frequency shift keying (FSK) data.

9. A method of digital demodulation comprising:
detecting a signal transition;
sampling a detected analog signal at a clock rate to produce a discrete time signal;
filtering the discrete time signal;
detecting a plurality of transitioning edges of the discrete time signal;
determining a transition time period between similar transitioning edges of the discrete time signal;
storing transition time period information; and
determining digital bit data based at least in part on the stored transition time period information.

10. The method of claim 9 wherein the transitioning edge is a rising-to-rising edge or a falling-to-falling edge.

11. The method of claim 10 wherein the clock rate is around approximately 57.6 kHz.

12. The method of claim 10 further comprising determining digital bit data based on the stored transition time period information and associated signal information consisting of information selected from a detected signal period, a cycle period, an on/off signal period, decision histories and a combination thereof.

13. The method of claim 10 further including filtering the detected analog signal.

14. The method of claim 10 wherein the digital demodulation is applied to frequency shift keying-modulated information.

15. A digital demodulator adapted to:
detect a signal transition;
sample a detected analog signal, according to a clock rate, to generate a discrete time signal;
filter the discrete time signal;
detect a transitioning edge of the discrete time signal;
determine a count time between similar edge transitions of the discrete time signal;
store count time history information; and
determine digital bit data based at least in part on the stored count time history information.

16. The digital modulator as recited in claim 15 wherein the detected analog signal contains frequency shift keying-modulated information.

17. The digital modulator as recited in claim 15 further adapted to filter the detected analog signal.

18. The digital modulator as recited in claim 15 wherein the transitioning edge is a rising-to-rising edge or a falling-to-falling edge.

19. A system comprising a digital demodulator wherein the digital demodulator includes:
level crossing circuitry having an input and an output, operable to determine a level crossing in connection with comparing an input signal level to a reference level;
digital synchronization circuitry having an input coupled to the output of the level crossing circuitry and having an output, operable to synchronize a continuous analog input signal with a clocked sampling signal to produce a discrete time signal;
a digital glitch filter having an input coupled to the output of the digital synchronization circuitry and having an output;
edge detection circuitry having an input coupled to the output of the digital glitch filter and having an output, operable to determine a rising-to-rising edge or a falling-to-falling edge of the discrete time signal;
a decision module to determine digital data from demodulated signals, including:
a count circuit to count time between similar edges of the discrete time signal, having an input coupled to the output of the edge detection circuitry and having an output;
a store counts circuit to store count time history information, having an input coupled to the output of the count circuit and having an output; and
a decide circuit to determine the digital data based at least in part on the stored count time history information, having an input coupled to the output of the store counts circuit.

20. The system of claim 19 wherein the system is selected from the group of systems consisting of a modem, a universal asynchronous receiver/transmitter (UART) and a combination thereof.

* * * * *